(No Model.) 5 Sheets—Sheet 1.

F. F. RAYMOND, 2d.
MACHINE FOR MAKING AND DISTRIBUTING NAILS.

No. 394,610. Patented Dec. 18, 1888.

WITNESSES
INVENTOR

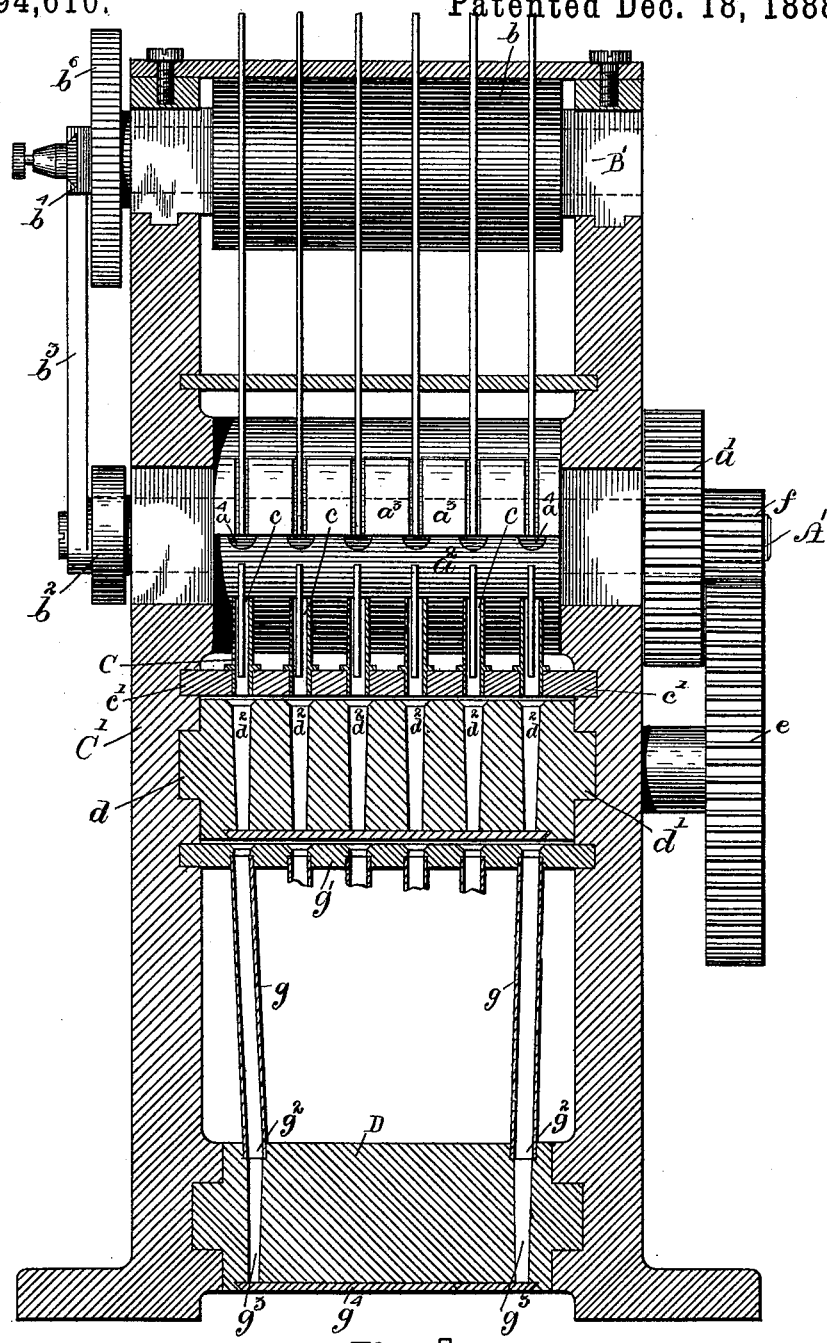

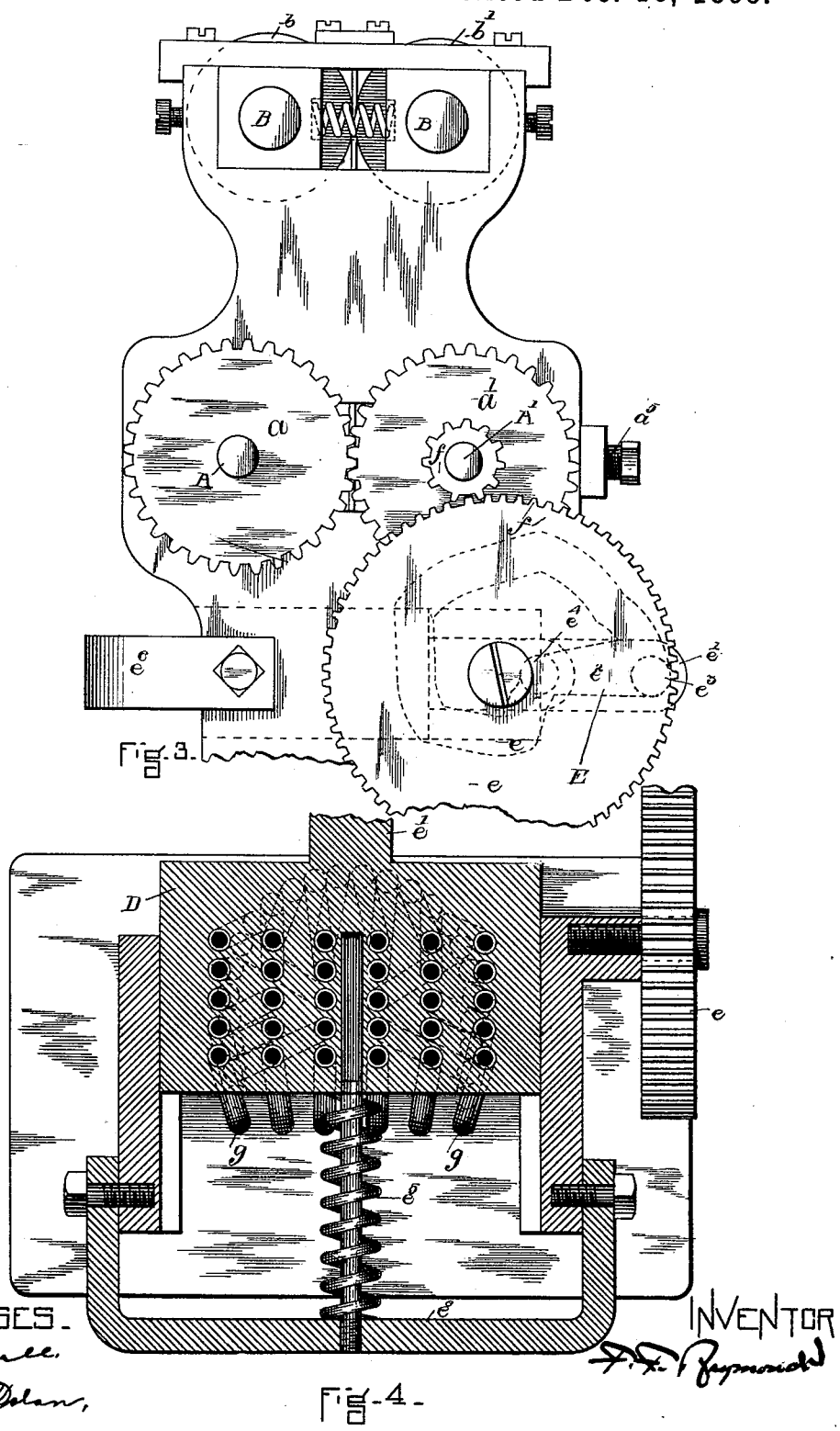

(No Model.) 5 Sheets—Sheet 4.

F. F. RAYMOND, 2d.
MACHINE FOR MAKING AND DISTRIBUTING NAILS.

No. 394,610. Patented Dec. 18, 1888.

WITNESSES INVENTOR

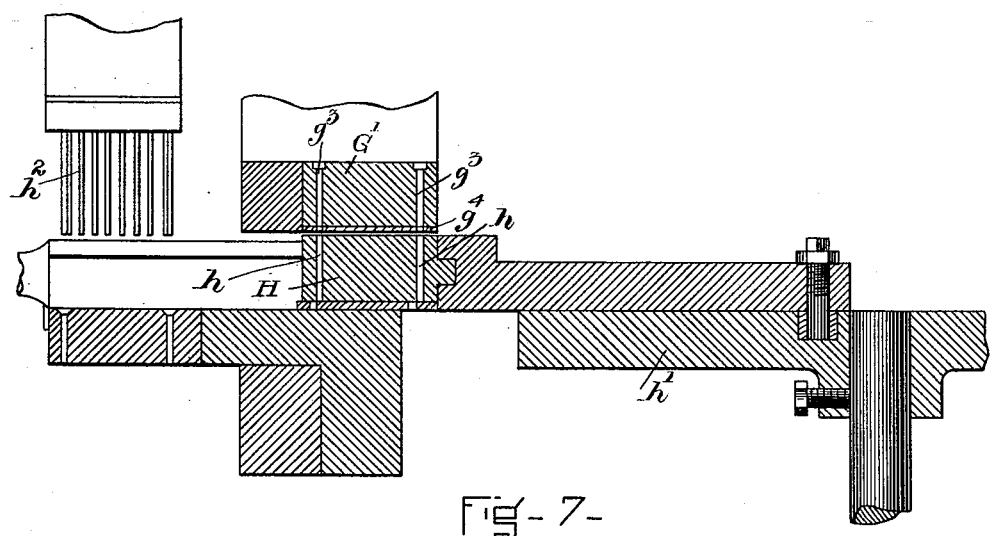

UNITED STATES PATENT OFFICE.

FREEBORN F. RAYMOND, 2D, OF NEWTON, MASSACHUSETTS.

MACHINE FOR MAKING AND DISTRIBUTING NAILS.

SPECIFICATION forming part of Letters Patent No. 394,610, dated December 18, 1888.

Application filed March 31, 1888. Serial No. 269,056. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Nail Making, Distributing, and Driving Machines, of which the following is a full, clear, and exact description, reference being had to the accompanying drawings, forming a part of this specification, in explaining its nature.

The invention is an improvement upon that described in my application for Letters Patent of the United States, filed December 9, 1887, Serial No. 257,367, and allowed March 12, 1888.

It relates especially to the form, movement, and arrangement of the holes in the sliding block which receives the nails from the nail-making devices, and to its operating devices, and to the form or arrangement of the distributer, and to the combination which these parts bear to the other principal parts of the mechanism; and it further relates to the various details of organization, all of which will hereinafter be specified.

Figure 1:
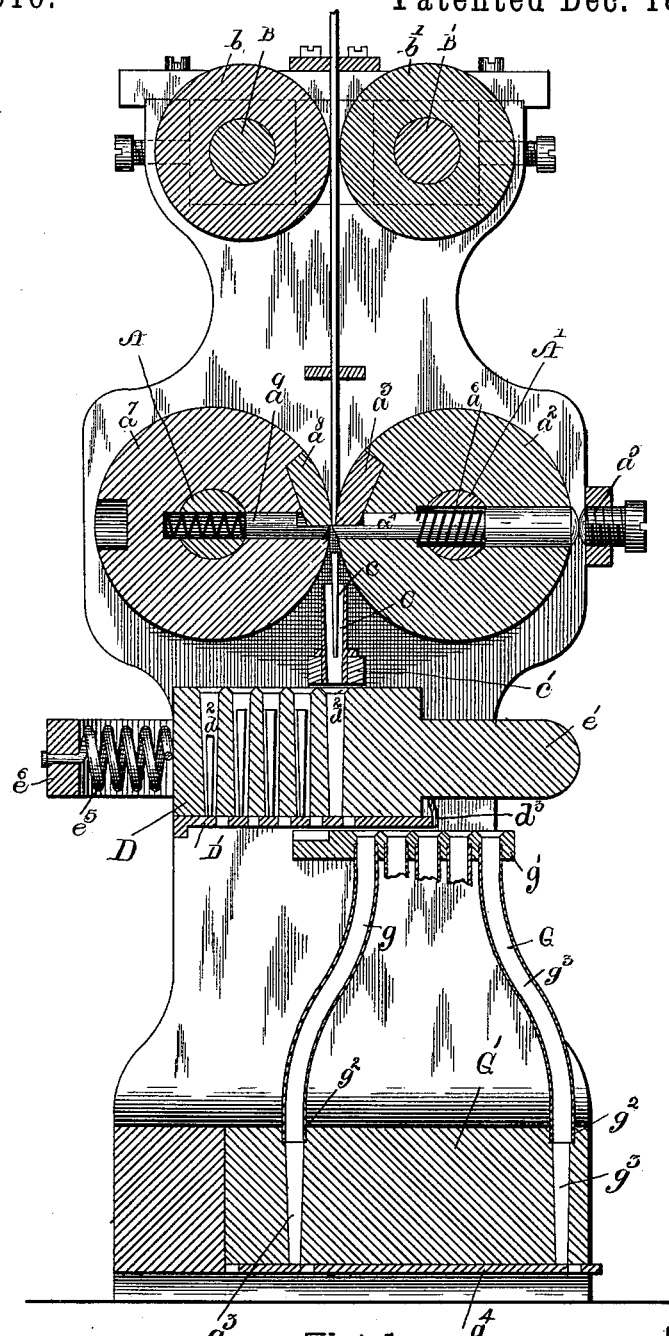
Figure 5:
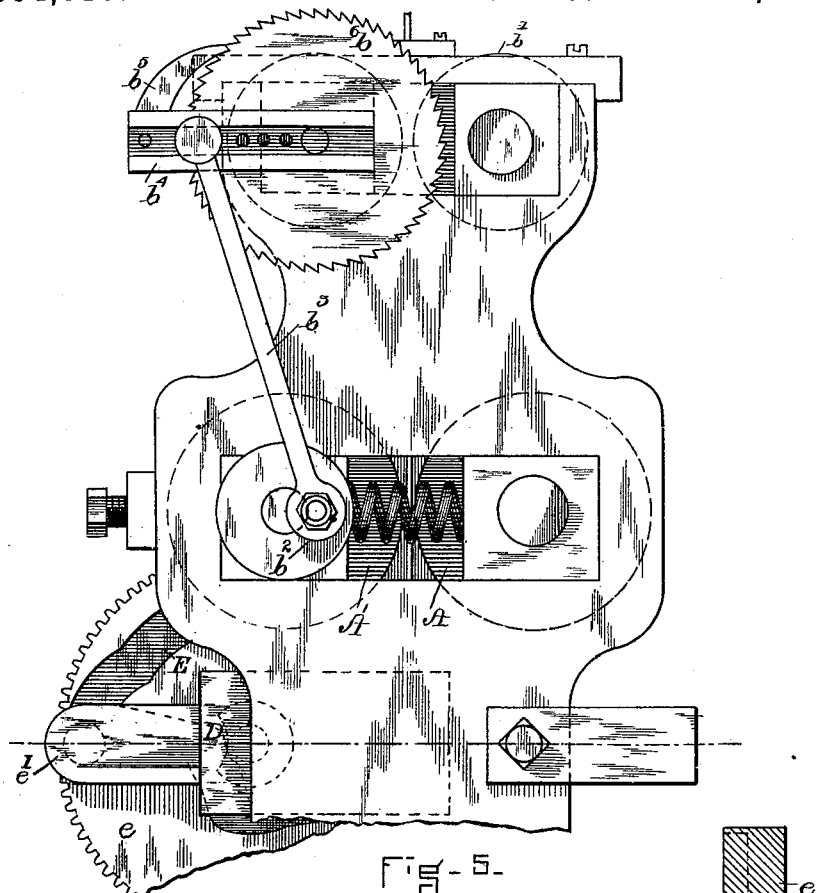
Figure 6:
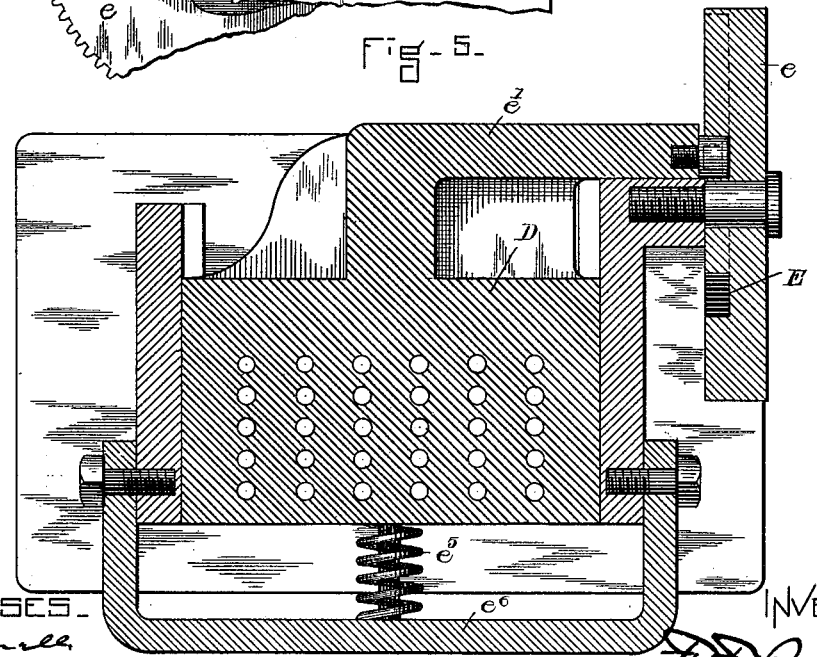

In the drawings, Figure 1 is a view in vertical cross-section from front back to rear of the machine. Fig. 2 is a view in vertical section of the machine from side to side. Fig. 3 is a detail view in elevation to illustrate especially a portion of the mechanism for moving the receiving-plate. Fig. 4 is also a detail view in horizontal section through the receiving-plate, and illustrating by dotted lines the relation which its holes when in registering position bear to the block or nail-carrier with which they are connected. Fig. 5 is also a view in elevation of a side of the machine, further illustrating devices for operating the receiving-plate. Fig. 6 is a view in horizontal section of the receiving-plate and its operating-cam. Fig. 7 is a view illustrating the relation of the distributer and nail-carrier to the nail-driving devices.

The machine is represented as organized to simultaneously make and deliver one nail each from a number of wires, the mechanism for feeding and forming nails upon the ends of six wires being represented. The nail feeding and making devices are like those described in my said application, and need only be briefly referred to here, and they comprise the shafts A A', which are geared together by the gears $a$ $a'$, (see Fig. 3,) and one of which supports or carries a number of rolls, $a^2$, each of which has the section $a^3$ of a pointing-die and a cut-off or severing block, $a^4$, adapted to be moved or operated across the end of the dies when in the position represented in Fig. 1 by a cam or actuating device, $a^5$, and to be returned to its normal position by a spring, $a^6$. The other shaft, A, supports or carries the rolls $a^7$, each of which has the section $a^8$ of the die, which co-operates with the section $a^3$, and a presser-block, $a^9$, which co-operates with the cut-off $a^4$, as described in Patent No. 375,209. Above the shafts A A' are shafts B B', upon which are mounted feed-rolls $b$ $b'$, and one shaft, B, and the feed-rolls thereof are positively intermittingly rotated by means of the crank $b^2$ upon the shaft A', the link $b^3$, which connects the crank with a pawl-lever, $b^4$, the said pawl-lever, its pawl $b^5$, and the ratchet-wheel $b^6$ upon the shaft B.

So far the mechanism is like that described in my said application. I prefer to arrange below the meeting points of the dies a line of tubes, C, one for each set of dies, which furnishes or provides a throat, $c$, through which the nails drop or are delivered to the holes of the receiving-block D. These tubes are represented as supported by a common holding-plate, $c'$, carried or supported by the frame C' of the machine.

The receiving-block D is well represented in Figs. 1, 2, 4, and 5, and it has the bearings upon its sides $d$ $d'$ in the frame C', and instead of being moved upon the line of the throats $c$, as described in my said application, it is moved in a direction at a right angle to this line, and it is provided with nail-receiving holes $d^2$, which are arranged in a number of lines extending across the block from side to side, and in Fig. 6 I have represented the block as having five lines of nail-receiving holes. By moving the block in this manner and arranging the holes in lines I am enabled to bring the dies and throats of the machine more closely to each other and also to arrange the nail-receiving holes in the receiving-blocks in a better relation to each other for the construction and curve of the tubes of the distributer. The receiving-block is provided with an intermittent movement to bring each line of holes in position beneath the throats $c$ in successive order by means of a cam-groove, E, formed in the cam-disk $e$, which is connected with the receiving-block D by means of the arm $e'$. (See Fig. 6.) This cam E is constructed to provide the receiving-block with alternate advancing or forward movements and periods of rest, so that each line of nail-receiving holes is brought in successive order beneath the line of throats and held there while it is receiving nails, and then advanced to bring the next line of nail-receiving holes in order in register with the throats. The cam where the nail-receiving block has five lines of holes is constructed to move the block forward five times and is connected with the shaft A' to make one revolution for every five revolutions of the shaft. This connection is represented as obtained by means of the pinion $f$ upon the shaft and the gear-teeth $f'$, which are formed upon the edge of the cam-disk. The cam, however, operates only to provide the receiving-block with a progressive movement in one direction. To return the receiving-block to a position to bring its holes into register with the holes of the distributer, the cam is constructed to provide a straight passage or groove, $e^2$, from the end $e^3$ of its track to its beginning $e^4$, and a spring, $e^5$, which preferably is compressed by the cam and receiving-block during its forward or progressive movement and which is represented in Fig. 1 as attached to a cross-bar, $e^6$, and to the forward end of the nail-receiving block D, and returns the block D automatically to its original position. This movement takes place immediately upon the stopping of the machine. In other words, upon the making of the last group of nails and their delivery to the last line of holes in the receiving-block the machine comes to rest, and at that instant the cam has been moved sufficiently far to permit the cam-pin to ride off the end of the track into the straight section $e^2$, and the spring, immediately acting, serves to quickly return the block to its original position, and upon the starting of the machine the cam-pin is then in such relation to the cam-groove that the block is caused to be advanced to permit the perforated sliding covering-plate D' to be closed by the spring $d^3$ and to bring the first line of holes into register with the throats.

The distributer G comprises the tubes $g$, the operating ends of which are arranged in lines corresponding to the lines of the nail-receiving holes of the block D, and they preferably are held together at their upper ends by the plate $g'$. Their lower ends are arranged to have any desired relation to each other, according to the shape of the article which is to be nailed.

The machine is represented as adapted to supply nails to a heel-attaching machine. Therefore the lower ends, $g^2$, of the tubes approximate the configuration of a heel-blank in plan, and their lower ends may be secured to a block, G', which may have holes $g^3$ in continuation of the holes $g^2$ of the tubes, and which may be used as a nail-holder by providing it with a sliding hole-covering plate, $g^4$, preferably adapted to be automatically moved.

The distributer may distribute nails directly to the drivers, as described in my patent, No. 346,607, or to a carrier or tranferrer, H, and in the drawings I have shown such a carrier or transferrer. It is provided with holes $h$, corresponding in number and arrangement with the holes $g^3$ of the distributer, and it preferably is automatically moved by a cam, $h'$, to carry the nails from the distributer to a position below the gang of drivers $h^2$. $h^3$ is the templet, to the holes of which the nails are delivered by the carrier or transferrer.

In operation the nails as they are made are delivered in groups in successive order to the various lines of holes of the receiving-block as they are successively moved into position to receive them, and upon receiving the last group of nails the block is automatically returned to its original position and delivers its nails to the distributer.

The avantage of the invention arises largely from the arrangement of the holes in the receiving-block in lines, whereby a large number of nails are deliverable into a comparatively small block, and also to the arrangement of the upper ends of the distributing tubes or passages in lines, whereby economy of space is obtained as well as a desirable location of the receiving ends of the tubes in relation to the delivery ends.

In my patent, No. 381,280, I have shown and described a nail making, distributing, and driving machine in which there is a nail-receiving block having a single line of holes, which holes are divided into groups in one sense, in that only a certain number of the entire number of holes is brought into line with each throat or passage through which nails are delivered, so that a number of holes at different position in the block are receiving nails simultaneously, and this arrangement of the holes in a single line answers very well for certain purposes; but it necessitates for the distribution of nails to a line or order for the attachment of holes a higher distributer and a more difficult one to make, in that all the holes being on the same line causes some of them to be not as well situated in relation to the arrangement of the holes in the lower end of the distributer as is desirable, it not only being necessary where a comparatively long nail is made to use a higher distributer, but even then where a large number of nails is made there must be quite a curve in some of the tubes between the upper and the lower ends of the distributer, and I have ascertained that instead of making all the holes upon the same line the line is divided into a number of lines or groups, which brings the nail-receiving holes into a more compact arrangement, and not only this, but that it enables a distributer to be made which shall be much shorter and provide straighter passages for the nails to drop through. Of course in a distributer of this nature it is desirable to make the passages between the top and the bottom of the distributer as straight as possible.

Having thus fully described my invention, I claim and desire to secure by Letters Patent of the United States—

1. The combination of mechanism for delivering gangs or groups of nails in successive order to a receiving-block, with said receiving-block having nail-receiving holes $d^2$, arranged therein upon a series of parallel rolls and adapted to be moved progressively to bring each line or row of nail-receiving holes into a receiving position, as and for the purposes specified.

2. The combination of devices for supplying nails in groups in successive order to a nail-receiving block, with said nail-receiving block having nail-receiving holes $d^2$, a cam constructed, as specified, to provide the block with a progressive movement in one direction and to allow its automatic return by another force, with said force in this case represented as a spring adapted to bear upon the block and return the same to its original position at the end of the feed movement of the cam, substantially as described.

3. The combination of devices for delivering groups of nails in successive order to a nail-receiving block, said nail-receiving block having its nail-receiving holes arranged in parallel lines therein, and a nail-distributer the openings or passages to which are arranged in parallel lines corresponding with the lines of nail-receiving holes of the receiving-block, substantially as described.

4. The combination of devices for supplying nails in groups in successive order to a nail-receiving block, said nail-receiving block having a number of parallel lines of nail-receiving holes, $d^2$, arranged therein, a cam for moving the block progressively in one direction, a spring for automatically returning the block to its original position, and a distributer having the upper ends of its holes arranged in parallel lines corresponding with the lines of holes in the receiving-block, as and for the purposes described.

5. The combination of devices for delivering nails in groups in successive order to a nail-receiving block, said nail-receiving block having a number of lines of holes, $d^2$, and adapted to be moved progressively in one direction to bring each parallel line of holes in successive order into a receiving position, a distributer having the upper ends of its holes or passages arranged in parallel lines, and nail-driving devices, substantially as described.

6. The distributer G, having a number of distributing cases or tubes, $g$, forming distributing-passages, the upper ends of which are assembled together in a number of lines, and the lower ends of which are out of line with their upper ends, as and for the purposes described.

7. The combination of the tubes G, having their upper ends arranged in a number of parallel lines, the connecting-plate $g'$, and the block or plate G', substantially as described.

FREEBORN F. RAYMOND, 2D.

Witnesses:
J. M. DOLAN,
E. P. SMALL.